United States Patent Office 3,502,730
Patented Mar. 24, 1970

3,502,730
HETEROCYCLIC PHOSPHINE OXIDES
Ronald F. Mason, John L. Van Winkle, and Rupert C. Morris, Mill Valley, Calif., assignors to Shell Oil Company, New York, N.Y., a corporation of Delaware
No Drawing. Continuation-in-part of application Ser. No. 468,573, June 30, 1965. This application Sept. 22, 1967, Ser. No. 669,710
Int. Cl. C07d 105/02
U.S. Cl. 260—606.5          10 Claims

ABSTRACT OF THE DISCLOSURE

Polycyclic, heterocyclic, tertiary phosphine oxides, wherein the phosphorus atom is a non-bridgehead member of a cyclic ring system, such as 9-hydrocarbyl - 9 - oxo-9-phosphabicyclo(4.2.1 and 3.3.1)nonanes, useful as additives to lubricants and gasolines and as herbicides.

CROSS-REFERENCES TO RELATED APPLICATIONS

This application is a continuation-in-part of copending application of Van Winkle, Morris and Mason, Ser. No. 468,573 filed June 30, 1965, now U.S. Patent 3,420,898.

BACKGROUND OF THE INVENTION

The utilization of pentavalent phosphorus compounds as addivtives in leaded gasolines and lubricants is well known. Wasserbach et al., U.S. 2,764,866 issued Oct. 2, 1956, disclose the incorporation of, inter alia, phosphine oxides in lead-containing hydrocarbon fuels, particularly in leaded aviation gasolines. Garner, U.S. 3,267,159 issued Aug. 16, 1966, discloses the employment of tertiary phosphine oxides as extreme-pressure additives to lubricants and as pre-ignition additives for leaded gasolines.

In such applications, the tertiary phosphine oxides are frequently subjected to contact with oxygen or other oxidizing agents, often at elevated temperature, and under such conditions the phosphine oxides exhibit a tendency to become further oxidized, i.e., to react more extensively with oxygen, which oxidation leads to phosphinic and phosphonic materials, many of which are acidic in character. The formation of such acidic oxidation products is, of course, deleterious to the metal components of internal combustion engines and the like with which the phosphine oxide-containing compositions are likely to come in contact. Instability toward oxidation to acidic products therefore limits utilization of phosphine oxides as additives to lubricants and gasolines.

SUMMARY OF THE INVENTION

It has now been found that certain hetero polycyclic tertiary phosphine oxides wherein the phosphorus is a non-bridgehead ring atom of a bicyclic ring system exhibit stability toward oxidation to acidic products, which stability is greater than that observed in the cases of acylic tertiary phosphine oxides, and is particularly advantageous for use of the substances in liquid petroleum compositions subject to oxidative conditions.

DESCRIPTION OF PREFERRED EMBODIMENTS

The tertiary phosphine oxides are P-oxides of polycyclic monophosphines wherein the single phosphorus atom is a non-bridgehead ring atom of a bicyclic ring system and the remaining valence of the phosphorus is satisfied by a monovalent hydrocarbyl substituent. One class of such compounds comprises the hydrocarbon tertiary phosphine oxides of from 9 to 40 carbon atoms, preferably from 12 to 30 carbon atoms, represented by the formula

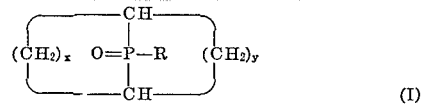

(I)

wherein R is hydrocarbyl, $x$ is a whole number from 3 to 4 inclusive, and $y$ is a whole number from 2 to 3 inclusive selected so that the sum of $x$ and $y$, i.e., the term $(x+y)$, is 6.

The R term of the above Formula I is hydrocarbyl of 1 to 32 carbon atoms, preferably 6 to 22 carbon atoms, and is acyclic or cyclic and is aliphatic or aromatic, but preferably is free from acetylenic carbon-carbon unsaturation. Acyclic R substituents include alkyl and alkenyl groups such as methyl, ethyl, isobutyl, allyl, hexenyl, dodecyl, oleyl, octadecyl, eicosyl, octacosyl and triacontyl, while cyclic aliphatic R substituents include cycloalkyl and cycloalkenyl groups such as cyclohexyl, cyclopentyl, cyclododecyl, cyclohexenyl, cyclooctenyl, cyclododecadienyl, 1-decahydronaphthyl, 1-[bicyclo(3.3.0)octyl] and 1-[bicyclo(3.3.0)oct-2-enyl]. R substituents which incorporate an aromatic moiety include aryl, alkaryl and aralkyl substituents such as phenyl, naphthyl, p-tolyl, xylyl, styryl and benzyl. In general, aliphatic R substituents are preferred over corresponding aromatic moieties, and particularly preferred are higher alkyl substituents of from 12 to 22 carbon atoms.

It will be apparent from consideration of the above Formula I that the novel polycyclic tertiary phosphine oxides exist in two isomeric forms. More particularly, these isomeric forms are represented by the formulas

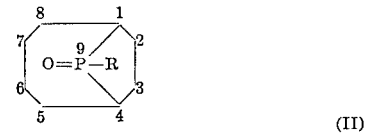

(II)

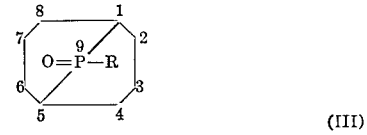

(III)

wherein the added numerals illustrate one conventional method of indicating the relative positions of the atoms present. It should be appreciated that the above-depicted atoms 1–8 are carbon atoms wherein all non-indicated valences are satisfied by bonding to hydrogen substituents.

Compounds of the above Formulas II are 9-hydrocarbyl - 9 - oxo-9-phosphabicyclo(4.2.1)nonanes illustrated by 9 - hexadecyl-9-oxo - 9 - phosphabicyclo(4.2.1) nonane, 9 - eicosyl - 9 - oxo-9-phosphabicyclo(4.2.1) nonane, 9 - phenyl - 9 - oxo - 9 - phosphabicyclo(4.2.1) nonane and 9 - cyclohexenyl - 9 - oxo - 9 - phosphabicyclo (4.2.1)nonane. Isomeric compounds of the above Formula III are 9 - hydrocarbyl-9-oxo - 9 - phosphabicyclo (3.3.1)nonanes as illustrated by 9 - octadecyl - 9 - oxo-9-phosphabicyclo(3.3.1)nonane, 9-bicyclooctenyl-9-oxo-9-phosphabicyclo(3.3.1)nonane and 9 - naphthyl-9-oxo-9-phosphabicyclo(3.3.1)nonane.

The phosphine oxides are produced by conventional oxidation of the corresponding tertiary phosphine, as by contact with air at moderate temperatures, e.g., 15–35° C. An alternate method of converting tertiary phosphines to corresponding phosphine oxides is illustrated by the disclosure of Priestly, U.S. 3,331,878 issued July 18, 1967.

The bicyclic tertiary phosphine precursors are produced, in one modification, by reaction of a primary phosphine, e.g., a phosphine of the formula R—PH$_2$ where R has the previously stated significance, with 1,5-cyclooctadiene in the presence of a "free radical-generating catalyst," which term refers to actinic radiation such as ultraviolet light as well as chemical initiators such as α,α′-azobisisobutyronitrile. By way of illustration, eicosylphosphine reacts with 1,5-cyclooctadiene in the presence of di(tert-butyl) peroxide at 135° C. in an inert reaction environment to produce a mixture of 9-eicosyl-9-phosphabicyclo(4.2.1)nonane and 9-eicosyl-9-phosphabicyclo(3.3.1)nonane, precursors of the compounds represented by the above Formulas II and III, respectively, wherein R is eicosyl. The production of the bicyclic tertiary phosphine precursors is described in greater detail in Netherlands application No. 6604094 published Sept. 30, 1966.

The mixture of isomeric polycyclic tertiary phosphines or phosphine oxides is separated into individual isomeric components, if desired, by conventional methods such as fractional crystallization, selective extraction or selective adsorption, but such separation is not necessary in order to obtain the advantages of the invention and in the preferred modification, the isomeric mixture of tertiary phosphine oxides is employed as such without separation of isomers.

The tertiary phosphine oxides are useful to inhibit the corrosiveness of lead-containing compositions such as leaded gasolines. Incorporation of about 5 mole-parts of phosphine oxide per mole of lead compound in a leaded gasoline serves to greatly reduce the corrosive character of the lead compounds. In another modification, incorporation of from about 0.1% to about 5% by weight of the tertiary phosphine oxides into a lubricant of the hydrocarbon, polyester or polyphenyl ether types serves to render the resulting composition more resistant to the effects of operation at high pressure. The polycyclic tertiary phosphine oxides are useful as herbicides, being effective against crabgrass and the like in contrast with analogous monocyclic tertiary phosphine oxides which exhibited no herbicidal activity. The polycyclic tertiary phosphine oxides are additionally useful as oxidation stabilizers and plasticizers for polymeric materials such as polyvinyl chloride, polyurethanes and cellulosic materials.

To further illustrate the novel tertiary phosphine oxides of the invention, the following examples are provided. It should be understood that the details thereof are not to be regarded as limitations as they may be varied as will be understood by one skilled in this art.

Example I

A 500-ml. Morton flask fitted with stirrer, thermometer, condenser and dropping funnel was purged with nitrogen and charged with 157 g. (0.5 mole) of eicosylphosphine and 54 g. (0.5 mole) of redistilled cyclooctadiene. A nitrogen blanket was maintained over the mixture and the reactants were brought to 135° C. by immersion of the flask in an oil bath. A sample was removed and its infrared spectrum was recorded, after which a solution of 4 g. of di(tert-butyl) peroxide in 15 ml. of n-decane was added dropwise over a period of one hour to the remainder of the reaction mixture which was maintained at 135–145° C. After addition of the catalyst was complete, the mixture was heated for one hour, whereupon an examination of the infrared spectrum of the resulting product mixture showed that the olefinic band at 6.05μ had disappeared. Heating for one additional hour had no effect on residual P—H absorbance in the infrared. The mixture was distilled to give 155 g. of a mixture containing phosphabicyclononanes, of which about 40% was the 9-eicosyl-9-phosphabicyclo(4.2.1)nonane isomer and about 60% was the 9-eicosyl-9-phosphabicyclo(3.3.1)nonane isomer, B.P. 230–238° C. at 3 mm. (M.P. 38–39° C.) which represented an 84% yield based on an 87% conversion. The analysis of the product is given below.

Analysis.—Calc'd (weight percent): C, 79.6; H, 13.1; P, 7.3; basicity, eq./100 g. 0.24. Found (weight percent): C, 79.8; H, 13.2; P, 7.3; basicity, eq./100 g. 0.23.

Example II

A phosphine mixture consisting of approximately 30% 9-eicosyl-9-phosphabicyclo(4.2.1)nonane and approximately 70% 9-eicosyl-9-phosphabicyclo(3.3.1)nonane was dissolved in twice its weight of butanol. Air was passed through the solution which was maintained at 30° C. for 4–5 hours until gas-liquid chromatographic analysis of a sample of the product mixture indicated the absence of phosphine. The butanol solvent was removed by distillation and the resulting product distilled under reduced pressure to afford 182 g. of a mixture of approximately 30% 9-eicosyl-9-oxo-9-phosphabicyclo(4.2.1)nonane and about 70% 9-eicosyl-9-oxo-9-phosphabicyclo(3.3.1)nonane, B.P. 263–265° C. at less than 0.1 mm., which represented a yield of 71.3%.

Example III

To compare the oxidation stability in a hydrocarbon medium of the polycyclic tertiary phosphine oxides of the invention with that of conventional phosphine oxides, 20% by weight solutions in n-octadecane were prepared from the 9-eicosyl-9-oxo-9-phosphabicyclononane product of Example II and from tri-n-hexylphosphine oxide. Each solution was maintained at 200° C. while air was passed through the solution at the rate of 0.4 standard cubic feet per hour. At the end of one hour, a sample of each solution was withdrawn and subjected to gas-liquid chromatographic analysis to determine loss of phosphine oxide by oxidation. Of the trihexylphosphine oxide, 16.33% mole had been lost by oxidation, whereas 12.67% of the 9-eicosyl-9-oxo-9-phosphabicyclononane had been oxidized. The relative first-order rate constants for the oxidations were calculated and it was found that the rate of oxidation of trihexylphosphine oxide was 1.25 based on an oxidation rate of 1.00 for the 9-eicosyl-9-oxo-9-phosphabicyclononane.

Similar results are obtained when the polycyclic tertiary phosphine oxide is 9-dodecyl-9-oxo-9-phosphabicyclo(4.2.1)nonane, 9-cyclohexyl-9-oxo-9-phosphabicyclo(3.3.1)nonane or 9-{1-[bicyclo(3.3.0)oct-2-enyl]}-9-oxo-9-phosphabicyclo(3.3.1)nonane.

We claim as our invention:

1. The hydrocarbon tertiary phosphine oxide of from 9 to 40 carbon atoms represented by the formula

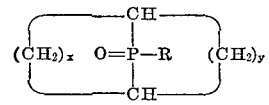

wherein R is hydrocarbyl free from acetylenic unsaturation, $x$ is a whole number from 3 to 4 inclusive and $y$ is a whole number from 2 to 3 inclusive selected so that the sum of $x$ and $y$ is 6.

2. The compound of claim 1 wherein R is acyclic aliphatic of from 1 to 32 carbon atoms.

3. The compound of claim 2 wherein R is alkyl of 12 to 22 carbon atoms.

4. The compound of claim 3 wherein R is dodecyl.

5. The compound of claim 3 wherein R is eicosyl.

6. The compound of claim 5 wherein $x$ is 4.

7. The compound of claim 5 wherein $x$ is 3.

8. The compound of claim 1 wherein R is cyclic aliphatic of from 6 to 22 carbon atoms.

9. The compound of claim 8 wherein R is cyclohexyl.
10. The compound of claim 8 wherein R is 1-[bicyclo-(3.3.0)-oct-2-enyl].

References Cited

UNITED STATES PATENTS

| | | | |
|---|---|---|---|
| 3,420,898 | 1/1969 | Van Winkle et al. | 260—606.5 X |
| 2,996,527 | 8/1961 | Krespan | 260—606.5 X |
| 3,010,946 | 11/1961 | Garner | 260—606.5 X |
| 3,225,103 | 12/1965 | Welcher | 260—606.5 |

TOBIAS E. LEVOW, Primary Examiner

W. F. W. BELLAMY, Assistant Examiner

U.S. Cl. X.R.

71—86; 252—399, 49.8; 260—45.7